United States Patent Office 2,789,594
Patented Apr. 23, 1957

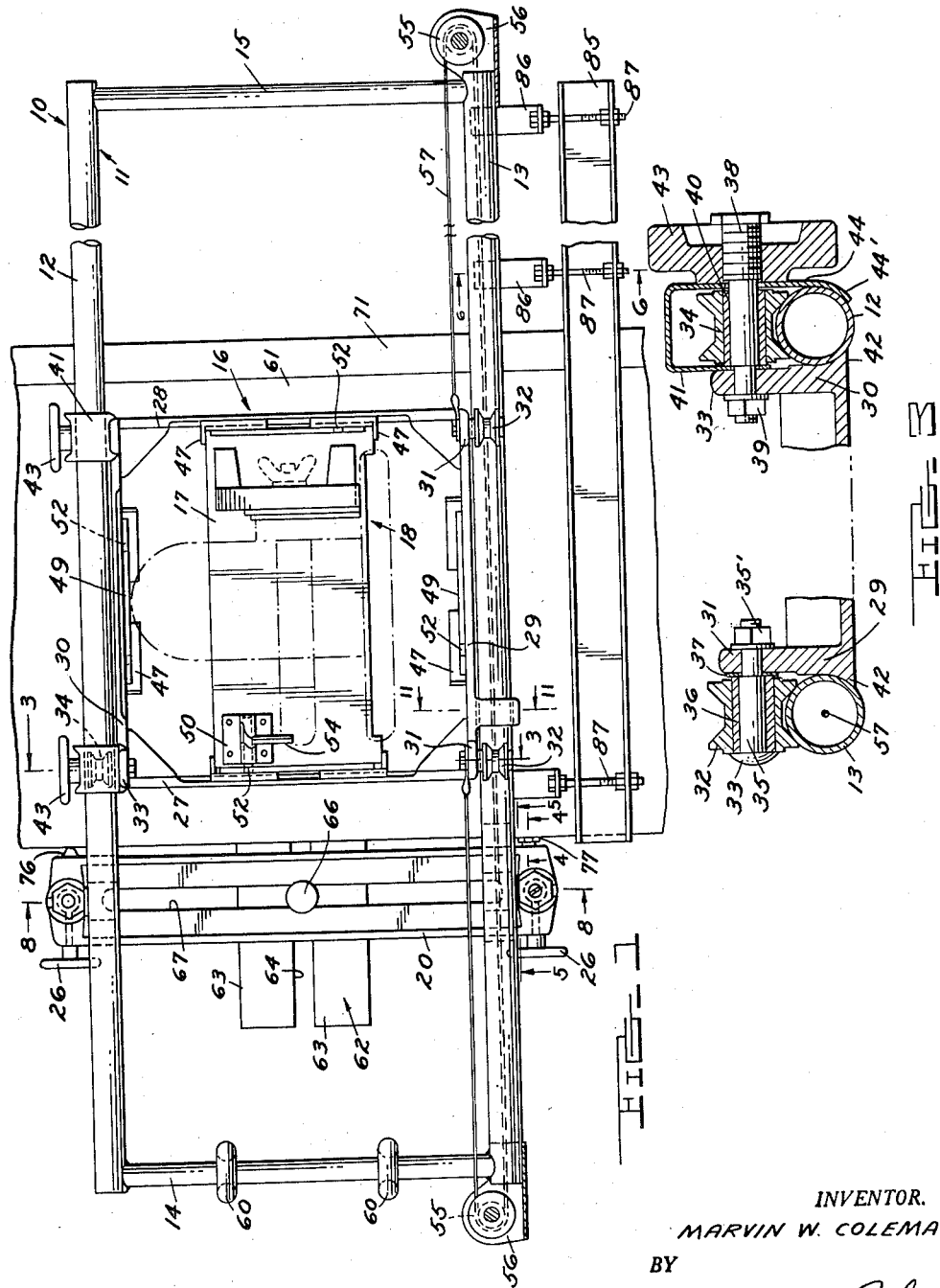

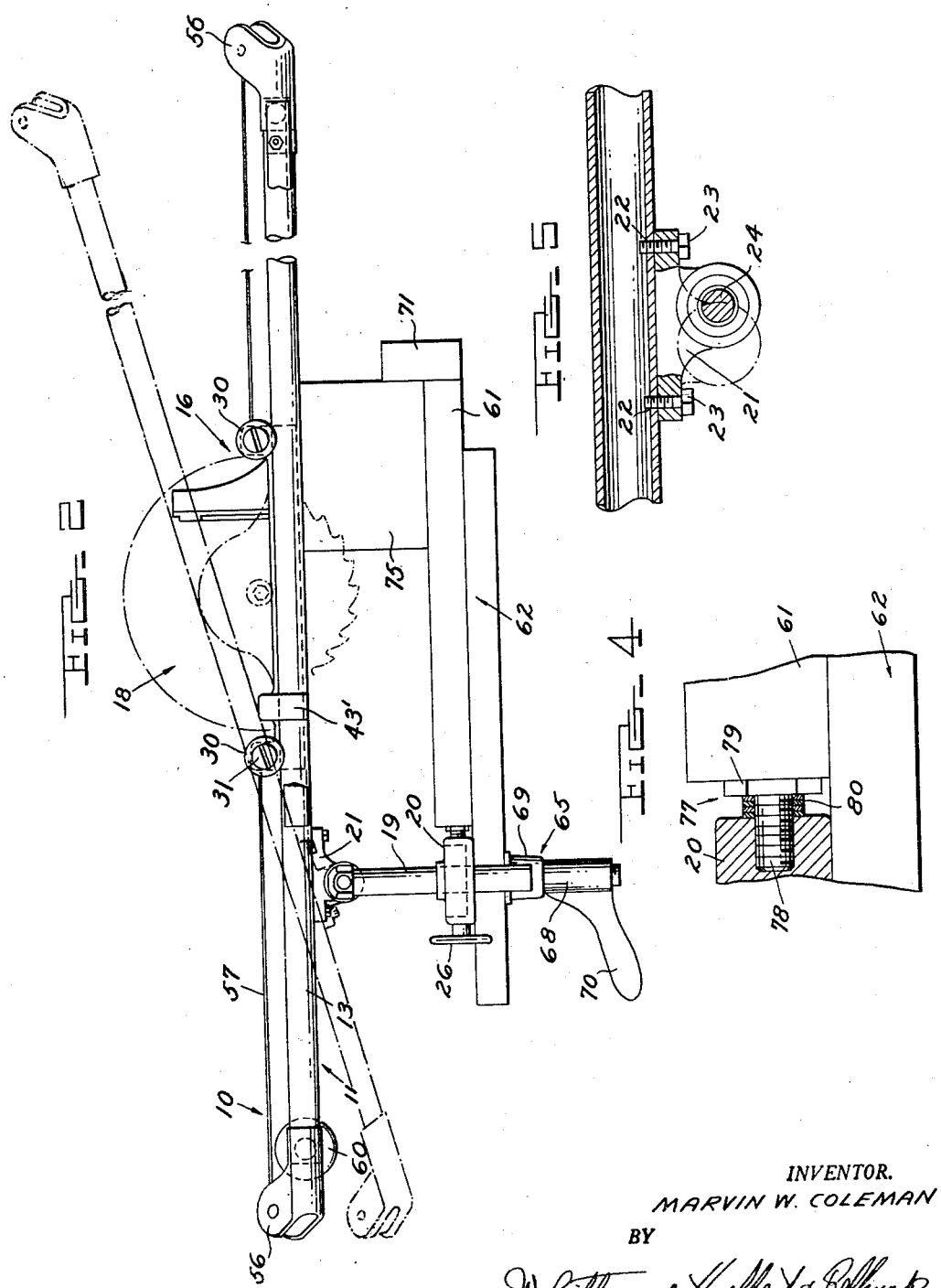

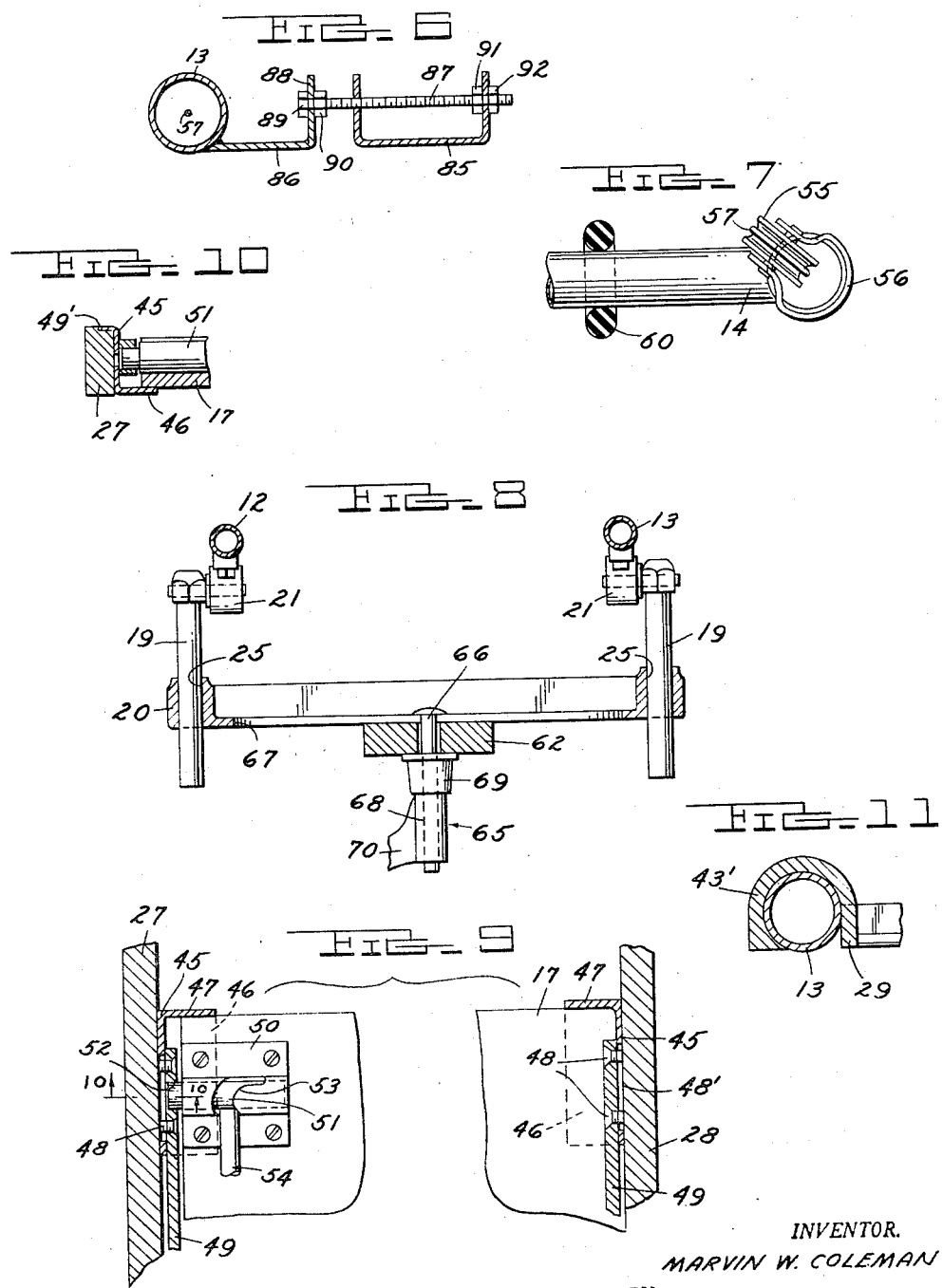

2,789,594
GUIDE FOR POWER DRIVEN ROTARY TOOLS
Marvin W. Coleman, Dearborn, Mich.
Application May 24, 1954, Serial No. 431,834
10 Claims. (Cl. 143—47)

This invention relates to a guide for rotary tools, and more particularly to a guide for controlling the path of movement of a tool such as a rotary saw.

One object of this invention is to provide a guide having a track supported between its ends for vertical swinging movement about a transverse axis, and having a tool supporting carriage movable along the track from one side of the pivot axis to the other. It is thus possible to utilize the weight of the tool to clamp the work on the bench during a sawing or other operation. In this connection, it is a feature of the invention to provide buffer means at the rear end of the track for absorbing shock upon the carriage when the latter is retracted. The buffer means also acts to cushion the track when tilted.

Another object of the invention is to provide a guide capable of supporting a portable power saw, for example, in various positions suitable to rip, cross cut, angle cut, etc. work supported on the bench. In this connection, novel means are also provided for enabling readily attaching the tool to the carriage in selected angular positions.

Still another object of the invention is to provide a guide for rotary tools having means conveniently operated to move the tool carriage throughout the full length of the guide. In making a cut on a work piece of any appreciable length, it is sometimes difficult for the operator to move the tool carriage manually throughout the length of the cut, and the present construction is designed to overcome this difficulty.

Further objects of the invention are to provide adjustable squaring means for the guide; a guide in the form of a track having rails reinforced for protection against bowing; a guide having a track pivotally supported intermediate its ends for vertical swinging movement about a transverse pivot axis which is adjustable lengthwise of the track; and a guide of relatively lightweight construction composed of a few simple parts capable of being inexpensively manufactured and easily set up for operation in a minimum period of time.

Other objects of the invention will become more apparent as the following description proceeds, especially when taken in connection with the accompanying drawings, wherein:

Figure 1 is a top plan view of a rotary tool guide embodying the features of the present invention;

Figure 2 is a side elevational view of the construction shown in Figure 1;

Figures 3 (sheet 1), 4, 5 (sheet 2), and 6 (sheet 3), are sectional views taken along the lines 3—3, 4—4, 5—5 and 6—6 respectively on Figure 1;

Figure 7 is an enlarged detailed view of a portion of the tool guide;

Figure 8 is a sectional view taken along the line 8—8 on Figure 1;

Figure 9 is a top plan view, partly in section, illustrating the arrangement for releasably supporting the tool on the carriage;

Figure 10 is a sectional view taken along the line 10—10 on Figure 9; and

Figure 11 is a sectional view taken along the line 11—11 on Figure 1.

Referring now more particularly to the drawings and especially to Figures 1 and 2 thereof, the rotary tool guide is indicated generally at 10 and will be seen to comprise a track 11 having a pair of laterally spaced rails 12 and 13 of tubular cross section and connected together at opposite ends by the tubular cross members 14 and 15. A carriage 16 is supported on the track 11 for movement lengthwise thereof from one end to the other, and the carriage supports a plate or supporting member 17 for a rotary power driven tool 18.

As shown particularly in Figures 1, 2 and 8, the tracks extend between a pair of cylindrical posts or uprights 19 carried by the transverse member 20 disposed beneath the track. The uprights 19 are respectively pivotally connected to the rails 12 and 13 of the track intermediate the ends of the latter by means of bosses 21. As seen in Figure 5, one boss 21 is formed with spaced apertures respectively aligned with the threaded apertures 22 in the undersides of tubular rail 13, and securing means such as bolts 23 are provided for detachably mounting the boss on the rail. The other boss is the same and mounted on rail 12 in a like manner. The bosses are each provided with transverse bearings for receiving pins 24 secured to the upper ends of uprights 19. The pins 24 extend in alignment transversely of the track and it will be apparent that the track is thus mounted for vertical swinging movement about the axis of the pins.

The axis of swinging movement for the track may be varied by merely reversing the bosses (as shown in dotted lines in Figure 5) due to the fact that the bearings for pins 24 are positioned closer to one of the boss apertures than to the other.

The uprights 19 are slidably supported in vertical openings 25 at opposite ends of transverse member 20. Hand wheels 26 are provided for retaining the respective uprights in selected positions against sliding movement, these hand wheels having shanks threadably engaging the transverse members adjacent to the openings 25 and being capable of advancement into engagement with the uprights to hold the same against sliding movement by merely rotating the hand wheels.

The carriage 16 comprises a rectangular frame composed of end bars 27 and 28 and side bars 29 and 30. The side bars are respectively positioned at the inner sides of the rails. Upstanding lugs 31 are formed at opposite ends of the side bar 29 and rollers 32 are rotatably mounted on the respective lugs 29 in positions to have rolling engagement with the top side of the rail 13. Lugs 33 are formed at opposite ends of side bar 30 and rollers 34 are rotatably mounted on the respective lugs 33 in positions to have rolling engagement with the top sides of rail 12. Referring to Figures 1 and 3, the rollers 32 are supported on axles 35 which have reduced portions extending through suitable openings in lugs 31 and are secured thereto by nuts 35'. The outer ends of the axles are headed to retain the rollers against axial shifting movement. Oilite bearing 36 may be sleeved upon the axle and anti-friction washers 37 may be carried by the axles between the rollers and lugs, if desired. The rollers 32 are thus held against axial shifting movement.

The rollers 34 are mounted for limited axial shifting movement. As seen in Figures 1 and 3, the axles 38 have reduced portions extending through suitable openings in lugs 33 and are secured thereto by nuts 39. The intermediate portions of the axles upon which rollers 34 turn have oilite bearings 40 sleeved thereon. Resilient U-shaped members 41 span the rollers 34 and the legs of members 41 are suitably apertured for reception of the axle. The legs of the U-shaped members 41 rather loosely embrace opposite sides of rollers 34 so that a limited amount of axial movement thereof is permitted. The rollers 34 are thus idler so that the carriage follows the rail 13 engaged by rollers 32. This overcomes many mechanical difficulties such as possible deviation from true alignment of the two rails which might otherwise cause the carriage to freeze or jamb.

The side bars of the carriage frame are also formed with integral anti-derail lugs 42 at opposite ends which extend under the rails and prevent the carriage from accidentally becoming derailed. Side bar 29 is also provided with an additional anti-derail lug 43' which also helps to prevent spreading of the rails.

It will be noted that leg 44 of each U-shaped member 41 has a rail clamping portion 44' which embraces a portion of the outer and under side of rail 12. In certain operations where it may be desired to lock the carriage against movement relative to the rails, the legs of the U-shaped members 41 may be drawn together by the mere rotation of hand wheels 43 threaded on the outer ends of axles 38, thus causing portions 44' to tightly grip rail 12 and locking the carriage against movement. This will also operate to grip rollers 34 tightly between the legs of members 41 preventing their rotation. Tightening of hand wheels 43 draws the carriage toward the hand wheels, and lugs 42 and 43' cooperate with rail 13 to prevent the carriage from jumping the track.

Referring now to Figures 1, 9 and 10, the plate 17 extends between the end bars 27 and 28 of the carriage frame. Secured to the inner sides of each end bar are a pair of spaced angle brackets 45 positioned with the flanges 46 projecting inwardly relative to the frame for supporting opposite ends of plate 17. The angle brackets are each formed with a vertically extending part 47 at one end for supporting the plate aginst lateral shifting movement. As seen in Figure 9, the bolts 48 for attaching the angle brackets to the end bars of the carriage frame are received in elongated slots 48' of the angle brackets permitting the latter to be secured to the end bars in various positions of adjustment as determined by the width of the plate 17. The brackets 45 also have outwardly turned flanges 49' which slide in recesses along the tops of the end bars and assist in properly positioning the brackets.

Retainers 49 are secured to the inner sides of the respective brackets 47 by the bolts 48 and extend in spaced relation above the flanges 46 to define slots for receiving an end of plate 17. Each retainer 49 has an opening 52 therein for a purpose to be described. A plate 50 is secured to the top surface of plate 17 and is formed with a semi-cylindrical central portion for slidably receiving a bolt 51 which is arranged to extend into opening 52 in one of the retainers 49. The plate 50 is formed with a cam slot 53 through which projects an arm 54 which is rigid with bolt 51. In the position of the arm 54 as shown in Figure 9, the bolt 51 is in its extended position engaging in the opening 52 of one retainer 49, it being noted that the other end of the plate is retained in the slot defined between the other retainer and flanges 46, and thereby locking plate 17 to the carriage. By merely rotating arm 54 in the cam slot, it will be apparent that the bolt is withdrawn to release the plate 17.

The side bars are similarly provided with angle brackets 47 and retainers 49 provided with openings 52. Thus, the plate 17 may be reversed from the position shown, and it may extend from side to side of the carriage, if desired, and locked in place in the same way.

It will be noted in Figures 1, 2 and 7 of the drawing that pulleys 55 are supported at opposite ends of the rail 13. In detail, U-shaped brackets 56 are secured to opposite ends of rail 13 and rotatably mount the pulleys. A cable 57 extends through the tubular rail 13, is reeved over the pulleys and has its opposite ends respectively attached to opposite ends of the carriage. It will be apparent that an operator may stand at one end of the track and by manipulation of the cable can cause the carriage to traverse the entire length of the track. This arrangement is of considerable assistance to the operator particularly if the distance through which the carriage must travel is great.

The rear cross member 40 carries a pair of annular resilient bumpers 60 which may be of rubber, for example. These bumpers absorb shock upon the carriage which might result when the latter is retracted and also prevent undue shock to the track when the latter is tilted against a supporting outrigger, for example.

Referring now to Figures 1 and 2, the guide 10 is shown as mounted on a bench or table 61 having an outrigger 62. The outrigger 62 comprises two members 63 which extend rearwardly beyond the bench and are spaced laterally from each other to provide a slot 64 which extends parallel to the track 11. In use, the cross member 20 rests on the top surface of the outrigger 62 at the rear side of the bench, and is secured thereon by a clamp 65. The clamp 65 comprises a vertical stud 66, which extends downwardly through the elongated slot 67 in cross member 20, and also projects through the slot 64 in the outrigger. A nut 68 is threaded on the lower end of stud 66, and a bearing part 69 is slidable on the stud and positioned to engage the under side of the outrigger. A suitable handle 70 is welded to the nut 68 in order to facilitate operation of the nut to selectively clamp the cross member 20 to and release the same from the outrigger 62.

The construction is such that the uprights 19, together with track 11 and carriage 16 may be swung to different angular positions about the vertical axis of stud 66, and may also be moving in the direction of length of the track relative to the bench toward and away from a work positioning fence 71 on the bench. The cross member may be positioned on the outrigger in the manner shown in Figure 2 in which the slot 64 of the outrigger is substantially midway between the track rails or the cross member may be shifted in the direction of its length, that is, transversely of the length of the track, to mount the guide 10 in other positions spaced laterally from that shown.

Assuming that it is desired to cut across a work piece 75, the latter is supported on the bench with the front edge abutting the fence 71. The guide 10 is then positioned on the outrigger 62 in the manner shown in Figure 2, and before clamp 65 is tightened, the uprights are squared with relation to the rear edge of bench 61. As seen in Figure 1, a fixed abutment 76 projects from the front edge of cross member 20 at one end of the latter, and an adjustable abutment 77 projects from the front edge of the cross member at the opposite end thereof. As seen particularly in Figure 4, the adjustable abutment 77 comprises a bolt 78 threadedly engaging in a bore in the cross member, and the head 79 of the bolt provides the abutting surface. Adjustment of the abutment 77 is accomplished by merely rotating the same. Washers 80 may, if desired, be provided on the shank of the bolt which together have a predetermined thickness and by screwing the bolt down upon the washers, a given adjustment of the abutment is readily obtained.

After the cross member has been positioned on the outrigger with its abutments engaging the rear edge of the table to square the cross member, the clamp 65 is tightened and track 11 is properly adjusted vertically with respect to the cross member to enable the rails 12 and 13 to rest on the top surface of the work. After the elevation of the track is determined, the hand wheels 26 are tightened to clamp the uprights against movement relative to the cross member, thereby to secure the track at a fixed elevation.

The guide may be adjusted lengthwise of the outrigger as pointed out above. In the event that the width of the work exceeds the corresponding dimension of the bench 61, a suitable filler block (not shown) may be inserted between the uprights and the adjacent rear edge of the bench.

If it is desired to cut the work piece at a predetermined angle, the clamp 65 needs merely to be loosened to permit swinging the guide about the axis of stud 66 to obtain the proper angle. In the event a plurality of cuts at the same angle are required, a filler block having the required angle may be inserted between the cross member and the rear edge of the bench.

At the start of the cutting operation, carriage 16 is positioned at the rear of the track whether a straight or angle cut is desired. In this position the preponderance of weight of the carriage 16 and associated parts is applied to the track at the rear side of the pivot pins 24 so that the track will be tilted downwardly at the rear. As the carriage is moved toward the work, the weight is shifted to the front side of the pivot pins 24 and the front end of the track is swung downwardly to the position shown in Figure 2 in clamping engagement with the work. Thus the work is held down against the bench by the weight of the track, carriage, tool 18 and associated parts as the operation is carried out. When the cut is completed, the carriage 16 is returned to the rear end of the track and as a result the track swings upwardly and releases the work.

In order to reinforce the track against bowing, the front portion thereof at the right of the pivot pins 24, as viewed in Figures 1 and 2, is rigidified by an elongated channel shaped member 85. Brackets 86, secured to rail 13 as by welding, are spaced along the front portion of the latter rail and extend outwardly therefrom having upturned flanges 88 provided with openings for receiving threaded connectors 87. These connectors are secured to the upturned flanges 88 by the nuts 89 and 90 and extend through openings in the flanges of the channel shaped member 85. Nuts 91 and 92 threaded on the outer ends of the connectors clamp the channel shaped member 85 rigidly in position. This channel shaped member 85 resists the tendency of the track to bow, particularly where the front portion of the track is of any considerable length.

What I claim as my invention is:

1. A guide for rotary power driven tools comprising laterally spaced uprights, a track extending between said uprights and having laterally spaced rails, means pivotally supporting the track intermediate the ends of the rails on the uprights for vertical swinging movement about an axis extending transversely of said track, a carriage supported on said rails for movement lengthwise thereof from one side of the pivot axis to the other, said carriage comprising a rectangular frame having a pair of side bars respectively positioned adjacent the rails and a pair of end bars respectively connecting the ends of the side bars, a support for a power driven rotary tool extending between one pair of bars, means on one of the bars of said one pair forming a slot for removably receiving one end of said support, means on the other bar of said one pair forming a slot, and a retractable member on said support adapted to be received in the second slot in its extended position.

2. A guide as defined in claim 1 wherein said retractable member comprises a bolt, and cam means for retracting and advancing said bolt.

3. A guide as defined in claim 2, said cam means comprising a laterally projecting part on said bolt, a sleeve embracing said bolt and secured to said support, and a cam slot in said sleeve receiving said part and effective to advance and retract said bolt upon rotation thereof by said projecting part.

4. A guide for rotary driven power tools comprising laterally spaced parallel uprights, a track extending between said uprights and having laterally spaced rails, means pivotally connecting said rails to the respective uprights at points intermediate the ends of said rails for vertical swinging movement of said track about an axis extending transversely thereof, said means comprising hinge bosses each having spaced apertures and a hinge axis intermediate said apertures, apertures in said rails spaced lengthwise thereof and aligned with the apertures in said bosses, securing means extending through said aligned apertures and releasably attaching said bosses to the respective rails, the hinge axis of each boss being located closer to one aperture thereof than the other permitting shifting of the axis of vertical swinging of said track upon reversal of said bosses, and a tool supporting carriage supported on said track for movement lengthwise thereof.

5. Structure as defined in claim 4 in which front and rear transverse members connect opposite ends of said rails, and buffer means carried by the rear transverse member for absorbing shock upon the track when tilted and upon the carriage when retracted.

6. A guide for rotary power driven tools comprising a pair of uprights, a track extending between said uprights and having laterally spaced rails respectively mounted on said uprights, a carriage having rollers on opposite sides thereof in positions to have a rolling engagement with said respective rails, axles respectively supporting said rollers on said carriage, the rollers on one side of said carriage being held against axial shifting movement relative to the associated axles and the rollers on the other side of said carriage being supported on the associated axles for limited axial shifting movement, the axles for the shiftable rollers each having a fixed roller abutment at one end and an adjustable roller abutment at the other end, said adjustable roller abutments each comprising a member having a portion arranged for clamping engagement with the adjacent rail of said track upon movement thereof toward the fixed abutment, and clamping screws threaded on the axles of the shiftable rollers operative to move said members toward said fixed abutments.

7. A guide for rotary power driven tools comprising a pair of uprights, a track extending between said uprights and having laterally spaced rails respectively mounted on said uprights, a carriage having rollers on opposite sides thereof in positions to have a rolling engagement with said respective rails, axles respectively supporting said rollers on said carriage, the rollers on one side of said carriage being held against axial shifting movement relative to the associated axles and the rollers on the other side of said carriage being supported on the associated axles for limited axial shifting movement, the axles for the shiftable rollers each having a generally U-shaped resilient member thereon straddling the associated roller with the legs of said member respectively providing fixed and adjustable roller abutments, each adjustable roller abutment being axially movable along the associated axle, and clamping screws threaded on the axles of the shiftable rollers operative to move said adjustable abutments toward said fixed abutments, said adjustable abutments having portions thereon arranged for clamping engagement with the adjacent rail of said track when said adjustable abutments are moved toward said fixed abutments.

8. A guide as defined in claim 7 in which said adjustable abutments also clamp the associated rollers against the fixed abutments holding the same against rotation when said adjustable abutments are moved toward said fixed abutments.

9. A guide for rotary power driven tools comprising a track having laterally spaced rails, a carriage movable along said track, said carriage having rollers on opposite sides thereof in positions to have a rolling engagement with said respective rails, axles respectively supporting said rollers on said carriage, the rollers on one side of said carriage being held against axial shifting movement relative to the associated axles and the rollers on the other side of said carriage being supported on the associated axles for limited axial shifting movement, the axles for the shiftable rollers each having a fixed roller abutment at one end and an adjustable roller abutment at the other end, said adjustable roller abutments each comprising a member having a portion arranged for clamping engagement with the adjacent rail of said track upon movement therof toward the fixed abutment, and clamping nuts threaded on the axles of the shiftable rollers operative to move said members toward said fixed abutments.

10. A guide for rotary power driven tools comprising a track having laterally spaced rails, a carriage movable along said track, said carriage having rollers on opposite sides thereof in positions to have a rolling engagement with said respective rails, axles respectively supporting said rollers on said carriage, the rollers on one side of said carriage being held against axial shifting movement relative to the associated axles and the rollers on the other side of said carriage being supported on the associated axles for limited axial shifting movement, the axles for the shiftable rollers each having a fixed roller abutment at one end and an adjustable roller abutment at the other end, clamping nuts threaded on the axles of the shiftable rollers operative to move said members toward said fixed abutments thereby to clamp said shiftable rollers between said fixed and adjustable abutments holding said shiftable rollers against rotation.

References Cited in the file of this patent

UNITED STATES PATENTS

| | | |
|---|---|---|
| 460,049 | Hill | Sept. 22, 1891 |
| 566,624 | Sager | Aug. 25, 1896 |
| 714,314 | Luther | Nov. 25, 1902 |
| 984,237 | Osburn | Feb. 14, 1911 |
| 1,528,536 | De Walt | Mar. 3, 1925 |
| 1,529,303 | Drucker | Mar. 10, 1925 |
| 1,842,630 | Rodning | Jan. 26, 1932 |
| 2,062,969 | Dutcher | Dec. 1, 1936 |
| 2,166,703 | Boice | July 18, 1939 |
| 2,396,961 | Meredith | Mar. 19, 1946 |
| 2,445,676 | Lasar | July 20, 1948 |
| 2,502,640 | Coleman | Apr. 4, 1950 |
| 2,589,554 | Killian | Mar. 18, 1952 |
| 2,596,524 | Bridwell | May 13, 1952 |
| 2,629,410 | Cadwell | Feb. 24, 1953 |
| 2,677,400 | Gaskell | May 4, 1954 |
| 2,736,349 | Francis | Feb. 28, 1956 |

FOREIGN PATENTS

| | | |
|---|---|---|
| 533,287 | Germany | Sept. 15, 1931 |
| 473,491 | Great Britain | Oct. 14, 1937 |